United States Patent [19]

Frease

[11] Patent Number: 4,664,561
[45] Date of Patent: May 12, 1987

[54] COMBINED RESIN-MECHANICAL MINE ROOF BOLT ANCHOR

[75] Inventor: Jerry Frease, Marion, Ill.

[73] Assignee: The Eastern Co., Naugatuck, Conn.

[21] Appl. No.: 895,705

[22] Filed: Aug. 12, 1986

[51] Int. Cl.⁴ ............................................. E21D 20/02
[52] U.S. Cl. ..................................... 405/261; 405/260
[58] Field of Search ............... 405/259, 260, 261, 303; 52/698, 704

[56] References Cited

U.S. PATENT DOCUMENTS

| | | | |
|---|---|---|---|
| 4,129,007 | 12/1978 | Rausch | 405/261 |
| 4,193,715 | 3/1980 | Vass | 405/261 |
| 4,305,687 | 12/1981 | Parker | 405/260 |
| 4,362,440 | 12/1982 | Glaesmann et al. | 405/260 X |
| 4,611,954 | 9/1986 | Cassidy | 405/261 |

Primary Examiner—Dennis L. Taylor
Attorney, Agent, or Firm—Charles S. McGuire

[57] ABSTRACT

A system is disclosed for anchoring a tensioned bolt in a drill hole in the roof of a mine, or other such location. The bolt is threaded from one end and has a head on the other end which carries a standard bearing plate. The bolt passes through a hollow tube having an outer diameter slightly (e.g., ⅛″) smaller than the bore hole diameter. The threaded end of the bolt engages a nut affixed to the upper end of the tube and extends through the nut to the end of the threads. A standard, mechanical, expansion anchor is carried on the threaded end of the bolt extending through the tube and is inserted into the drill hole behind a conventional, two-compartment resin package. As the bolt is pushed into the hole, the package is broken and the resin components are forced into the annular space around the hollow tube, as well as around the threaded end of the bolt and expansion shell. Rotation of the bolt to expand the anchor also rotates the hollow tube, mixing the resin components and forcing the mixture into voids in the wall of the drill hole. The hollow tube is tapered inwardly toward its lower end providing a wedge effect resisting downward movement in the drill hole.

6 Claims, 4 Drawing Figures

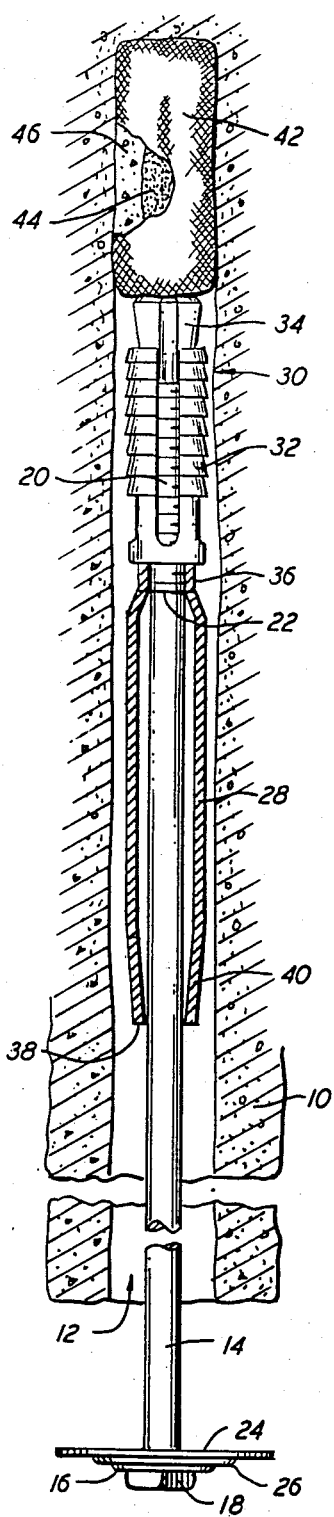
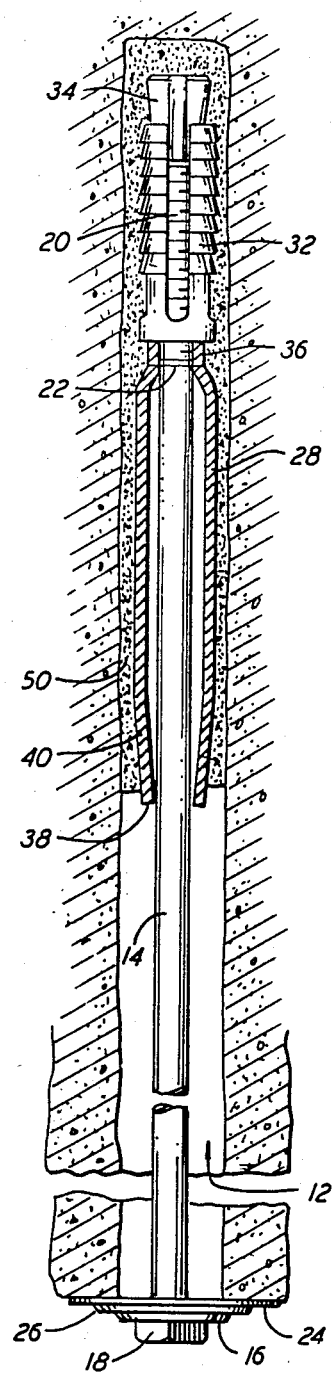
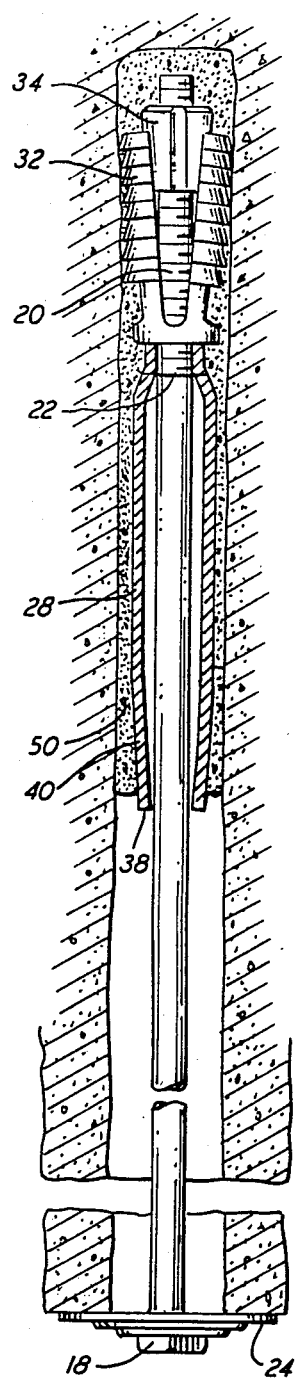
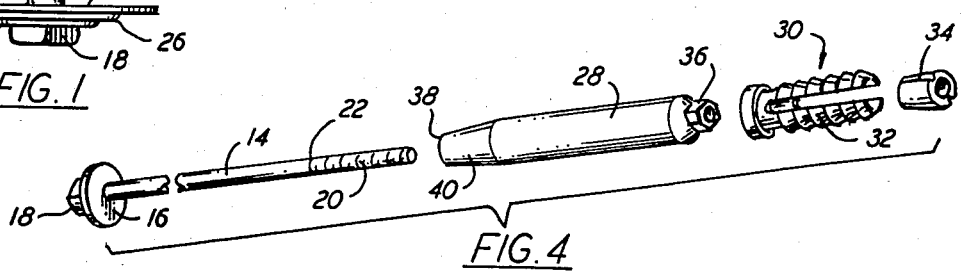
FIG. 1  FIG. 2  FIG. 3
FIG. 4

COMBINED RESIN-MECHANICAL MINE ROOF BOLT ANCHOR

BACKGROUND OF THE INVENTION

The present invention relates to mine roof support systems, and the like, and more specifically to the class of mine roof supports wherein a bolt carrying a bearing support plate is anchored in a bore hole by both a resin grouting and mechanical expansion anchor.

Two means which have been commonly used for many years to anchor elongated members in drill holes for the purpose of supporting and reinforcing the rock strata of mine roofs are chemical grouting and mechanical expansion anchors. Each of these systems had its own advantages and drawbacks, one of the early disadvantages of an anchorage provided solely by a chemical or other grouting being that the bolt or rod could not be tensioned by threading into a nut, or the like, within the bore hole to compress the rock strata between the bearing plate and inner end of the bore hole. This problem was overcome by the anchor system disclosed in Hill U.S. Pat. No. 3,877,235, which provided a resin grouted anchor which could also be tensioned by rotation of a threaded bolt after the resin had set sufficiently to hole a portion of the anchor as excess torque was applied to the bolt to break a stop means.

Anchoring systems both before and after the Hill patent utilized both resin grouting and mechanical expansion anchors in roof support systems utilizing various means for mixing the components of a two-part resin system. For example, in Dempsey U.S. Pat. No. 2,952,129 the components were mixed manually in a breakable container just before being placed in the bore hole; Schuermann et al U.S. Pat. No. 3,188,815 employed an expansion anchor which traveled down the threads as the bolt was rotated to mix the resin components, whereby expansion of the anchor upon reaching the bottom of the threads was delayed until mixing was complete; in Clark, et al U.S. Pat. No. 4,162,133 a two-compartment resin package was broken and the contents mixed by reverse spin of a bolt and expansion anchor, followed by forward spin to set the anchor; Callandra U.S. Pat. Nos. 4,413,930, 4,419,805, 4,516,885, and 4,518,292 all rely upon breaking a stop means by application of excess torque to the bolt, as in the Hill Patent, to expand the anchor after the resin has set sufficiently to resist continued rotation of the expansion anchor together with the bolt; White et al U.S. Pat. Nos. 4,483,645, 4,534,679 and 4,534,680 provide various means to delay expansion of the expansible portion of the anchor until after a predetermined number of revolutions of the threaded rod, normally a length of steel rebar having protrussions on the exterior surface to aid in the mixing process.

In recent years, improvements in the components and packaging of resin cartridges used in mine roof support applications have resulted in a significant decrease in the amount of time required for mixing of the resin and catalyst by rotation of a bolt, or other such member, within a bore hole. In fact, mixing time has been reduced to the point that it is no longer necessary to delay the opening of an expansion anchor used in combination with the resin to provide a tensioned roof bolt anchorage. Conventional expansion anchors are fully engaged and the bolt tensioned after about 3 to 5 seconds of rotation, which is sufficient to provide adequate mixing of the resin and catalyst, particularly when rebar having an embossed pattern on its outer surface is used in place of a smooth bolt. Thus, roof support systems are currently in use which include a two-compartment resin cartridge and a rebar carrying a standard expansion anchor on a threaded end portion thereof.

It is a principal object of the present invention to provide a mine roof anchor system including both resin grouting and a mechanical expansion anchor wherein the components of a two-compartment resin package are mixed in an improved manner as the anchor is set by rotation of the bolt on which it is carried.

A further object is to provide a combined resin-mechanical mine roof support system having superior anchoring capabilities with economy of components.

Another object is to provide an improved resin-mechanical anchoring system which may be installed rapidly, requiring no more time than installation of a standard expansion anchor.

Still another object is to provide a mine roof anchor system wherein a two-compartment resin package is inserted into a drill hole ahead of a threaded rod carrying a conventional, mechanical expansion anchor, and the resin components are mixed to provide a secure chemical anchor as the rod is rotated to set the mechanical anchor in the standard manner using only the number of revolutions needed to expand the shell of the anchor.

Other objects will in part be obvious and will in part appear hereinafter.

SUMMARY OF THE INVENTION

In furtherance of the foregoing objects the invention contemplates an anchoring system for firmly holding a roof bolt, or similar, elongated, threaded member, in a drill hole in a mine roof by means of both a mechanical expansion anchor and resin grouted surrounding both the expansion anchor and an elongated, hollow tube carried by the bolt. After the hole is drilled to the proper depth and the drill steel removed from the hole, a two-compartment resin package containing components which are initially in a semi-liquid or thixotropic state but which solidify and harden after being mixed, is inserted into the hole. Following the resin cartridge, a roof bolt, i.e., an elongated member threaded from one end and having a wrenchengageable head on the other end, is inserted in the hole.

The threaded end of the bolt passes through a hollow tube having an inside diameter larger than the bolt diameter and an outside diameter on the order of ⅛" smaller than the diameter of the bore hole, thus creating an annular space about 1/16" in thickness between the outside of the tube and the wall of the drill hole. The tube is internally threaded at one end, or has affixed thereto a nut for threaded engagement with the bolt. A mechanical expansion anchor of conventional design, including a radially expansible shell and tapered nut or camming plug, is engaged with the threaded end of the bolt extending past the internally threaded end of the tube. The bolt carries a standard mine roof support plate on its headed end, which remains outside the drill hole.

The threaded end of the bolt, carrying the expansion anchor and hollow tube, is inserted into the drill hole behind the resin cartridge, thereby breaking the package and releasing the two components to allow mixing thereof. The support plate is engaged with the mine roof when the bolt has been fully inserted and the resin components entirely surround the expansion anchor and at least partially fill the annular space between the tube and drill hole wall. The bolt is then rotated in a clockwise direction by means of conventional mining machinery to cause the camming plug to travel down the bolt and expand the shell into engagement with the drill hole wall.

The hollow tube is spun together with the bolt within the hole, creating a high degree of turbulence in the relatively thin layer of resin components surrounding the tube. The breaking of the resin package, allowing the components to flow around the expansion anchor and to be forced into the annular space surrounding the tube, followed by rotation of the bolt and tube until the expansion anchor is fully engaged, thoroughly mixes the resin components in the few seconds required for normal expansion of the mechanical anchor. In addition, the relatively high hydrostatic pressures generated in the resin components, causes them to fill both large and small interstices in the drill hole wall, as well as microscopic pores or cracks in the outer surface of the tube, which may be scored or indented but may be essentially smooth with equally advantageous results.

As a further advantageous feature, the hollow tube tapers inwardly for a portion of its length toward its lower end, where the inside diameter is only slightly greater than the bolt diameter. The resin fills at least a portion of the annular space surrounding the tapered portion of the tube. This provides a wedging effect, tending to prevent downward movement of the tube within the bore hole.

The foregoing, and other features of the invention will be more readily apparent from the following detailed disclosure and accompanying illustrative drawing.

BRIEF DESCRIPTION OF THE DRAWING

FIGS. 1–3 are a series of front elevational views of a preferred embodiment of the invention, showing various stages on the installation of the anchor system in a drill hole in a mine roof which, together with portions of the anchor system, is shown in vertical section; and FIG. 4 is an exploded, perspective view of the mechanical elements of the anchor systems.

DETAILED DESCRIPTION

Referring now to the drawing, a fragment of rock strata 10, such as a roof or wall of a mine passageway, is shown in vertical section. Drill hole 12 has been formed with a standard hydraulic drilling machine to a desired depth, depending principally upon the nature of strata 10 as required in order to achieve the required anchoring and support. Bolt 14 is a standard mine roof bolt, fabricated from smooth steel rod of appropriate diameter, e.g., $\frac{5}{8}''$ or $\frac{3}{4}''$, with flange 16 and head 18 swaged on one end and threads 20 cut or rolled from the opposite end for a portion of the length of the bolt, down to thread terminus 22. Conventional roof support plate 24 is carried on the headed end of bolt 14, which passes loosely through an opening in the center of plate 24 with washer 26 positioned between the plate and flange 16 of the bolt.

In addition to bolt 14 and support plate 24, the assemblage of mechanical elements of the invention includes hollow tube 28 and mechanical expansion anchor 30. As with bolt 14 and support plate 24, anchor 30 is conventional in all respects, comprising radially expansible shell 32 and tapered nut or camming plug 34 which is threaded on the end of bolt 14 with its smaller end entering shell 32. As bolt 14 is rotated, with shell 32 restrained against both rotational and logitudinal movement, rotation or bolt 14 causes plug 34 to travel along threads 20 with the increasingly larger dimension of the plug expanding the shell radially outwardly into firm engagement with the wall of the bore hole, in well known manner. Details of anchor 30 need not be discussed further since any of a large number of commercially available expansion anchor designs having the foregoing general features are suitable for employment in the present invention.

Hollow tube 28 has an internally threaded opening at one end for engagement with threads 20 of bolt 14. This opening may be provided by reducing the diameter of tube 28 at one end and forming the threads directly therein, or by welding or otherwise permanently affixing an appropriately threaded nut 36 to the end of the tube. Tube 28 has an outside diameter somewhat smaller (e.g., $\frac{1}{8}''$) than that of drill hole 12 and an inside diameter somewhat greater (e.g., $\frac{1}{2}''$ to $\frac{3}{4}''$) than bolt 14. Tube 28 tapers inwardly for a portion 40 (e.g., one quarter to one third) of its length toward open end 38; which is only slightly (e.g., 1/16'') larger in diameter than bolt 14.

The anchoring system of the present invention also employs a conventional, two-compartment resin cartridge 42, containing resin and catalyst components 44 and 46. The structure of cartridge 42 keeps the components physically separated until the package is broken to allow them to be mixed together, whereupon the resin permanently hardens. The resin cartridges currently marked by Dupont of Wilmington, Del. under the trademark Faslock are suitable for employment with the present invention, as are others having relatively short mixing times. That is, while two-compartment resin cartridges generally available in the 1970's required mixing of the components by rotation of the roof bolt or rebar for about 20 seconds, presently available cartridges are sufficiently mixed by rotation for only about 3 to 5 seconds.

In use, the mechanical components are assembled by placing washer 26 and support plate 24 on bolt 14, inserting the threaded end of the bolt into end 38 of tube 28 and threading the bolt through nut 36 up to thread terminus 22. Mechanical anchor 30 is then placed on bolt 14 by threading the latter into plug 34 in the usual manner until the base of shell 32 abuts nut 36, as shown in FIG. 1. If desired, additional support means (not shown) for shell 32 may be placed on the threaded end of the bolt, between the base of shell 32 and nut 36; for example, a stamped, sheet metal, nut-like member of the type used for such purpose for many years and known in the industry as a Palnut, may be threaded onto the bolt.

After hole 12 is drilled to the proper depth, resin cartridge 42 is inserted, followed by the threaded end of bolt 14, carrying the other elements as just described. The bolt is one or two inches shorter than the depth of the hole. When cartridge 42 reaches the end of hole 12, as in FIG. 1, it is engaged between the end of the hole and the end of bolt 14, and/or plug 34, depending on how far the bolt has been threadedly advanced into or through the plug. Further, forced insertion of bolt 14 ruptures cartridge 42 and forces components 44 and 46 downwardly about expansion anchor 30, bolt 14 and tube 28, as in FIG. 2. The amount of resin used relative to the size of the drill hole and anchor components is preferably such that the mixed resin components extend essentially to the lower end of tube 28, as shown in FIGS. 2 and 3. As soon as bolt 14 has been fully advanced into hole 12, with support plate 24 seated against the face of rock formation 10, rotation is imparted to bolt 14 by hydraulic wrench engaged with head 18 thereof. The wrench is positioned on a hydraulically operated arm which pushes bolt 14 into drill hole 12 and through cartridge 40 in accordance with standard mining practices.

Tube 28 cannot advance further on bolt 14 since nut 36 is at the terminus 22 of threads 20. Therefore, rotation of the bolt is imparted to the tube. Shell 32 and plug 34 do not rotate with the bolt, due to frictional engagement of the shell with the bore hole wall, but rather plug 34 travels axially along threads 20 to effect radial expansion of shell 32, as in the conventional installation of such mine roof expansion anchors. The normal time of bolt rotation required to expand the shell and tension the bolt to the desired degree is on the order of 3 to 5 seconds, at about 300-400 rpm, for typical, conventional, mine roof expansion anchors, and is the same in the present invention since the mechanical anchor is set in the usual way.

The resin and catalyst are sufficiently mixed by such rotation of bolt 14 and tube 28 after being squeezed out of resin cartridge 42 and being forced to flow around anchor 30 and the end of bolt 14, and into the confined annular space between tube 28 and the wall of hole 12 by advance of the elements into the hole. The mixed resin components set up to form hardened grout 50 and provide a secure anchorage, together with expanded anchor 30, for bolt 14, as shown in FIG. 3. Although the time of rotation is relatively brief, a superior resin anchorage is achieved by generating high hydrostatic pressures in the components, particularly in the thin-walled, annular space around tube 28. Furthermore, the portion of the hardened resin surrounding tapered portion 40 of tube 28 assists in preventing any tendency of the tube to move downwardly in drill hole 12, thus assisting in providing a secure anchorage for bolt 14.

Desired dimensions are on the order of a 1/16" space between tube 28 and the wall of hole 12. For example, in drill holes of 1⅜" diameter, tube 28 is preferably 1¼" in outside diameter. Tube 28 may be in the order of 12" in length, although this dimension may vary in accordance with the type of anchorage desired. Bolt 14 may be, e.g., a ¾" or ⅝" standard mine roof bolt, or may be fabricated of steel rebar having an embossed pattern on its unthreaded surface although none of such surface comes in contact with the resin in the present invention, whereby the most economical and readily available materials may be used. About 6" of threads on the end of the bolt will normally by sufficient, when using conventional expansion anchors on the order of 4" in length (shell and plug) prior to expansion. With elements of such dimensions, relative to the diameter of the drill hole, after the resin cartridge has been broken, advancing the elements 1½" into the hole will result in resin components filling approximately a 12" length of the annular space surrounding the hollow tube.

Although the outer surface of tube 28 may be indented or have raised portions, it has been found that the anchorage provided by the resin grouting is essentially equally effective when an essentially smooth-surfaced tube is used. Of course, even tubes having a nominally smooth surface include small cracks or pores, as does the wall of the drill hole. The hydrostatic pressure created by forcing the resin components to flow into the relatively confined space around the tube and the rapid rotation of the tube cause the components to wash or score the surfaces of the tube and hole wall, entering the small cracks and other openings to create a very firm bond between the mechanical elements and the rock strata. The relatively thin-walled annular space provides a long chemical anchor with economy of resin and the hollow tube permits the use of less steel than, for example, a large diameter bolt or rebar filling the same space. The inward taper at the lower end of the tube also increases the anchorage strength due to the wedging effect provided by the resin surrounding the tapered portion of the tube.

What is claimed is:

1. A combined mechanical-chemical mine roof anchoring and stabilizing system for insertion into a drill hole of predetermined depth and diameter following a standard, two-compartment resin cartridge, said system comprising:
   (a) an elongated rod having a head at one end and threaded from the opposite end for a portion of its length;
   (b) a mechanical expansion anchor including a radially expansible shell and an internally threaded camming plug engaged with the threads of said rod for movement of said plug into said shell to effect expansion thereof into engagement with the wall of said drill hole in response to rotation of said rod in a predetermined direction;
   (c) means for maintaining said plug and shell in assembled relation on said rod prior to expansion of said shell;
   (d) a hollow tube carried by said rod and rotatable in response to rotation of said rod, said rod extending axially through said tube between first and second ends of the latter, adjacent to and remote from said expansion anchor, respectively; and
   (e) means closing at least said first end of said tube about said rod, said rod having a length so related to said predetermined depth that said resin cartridge is broken and components carried thereby released by forcing said rod into said hole behind said cartridge, and a diameter less than the internal diameter of said tube, the outside diameter of said tube being only slightly less than the diameter of said hole to provide a relatively thin annular space surrounding said tube into which said resin components flow and are mixed as said bolt and tube are rotated.

2. The invention according to claim 1 wherein the thickness of said annular space is on the order of about 1/16".

3. The invention according to claim 2 wherein said means closing said first end of said tube comprise an internally threaded portion of said first end of said tube with which the threaded portion of said rod is engaged.

4. The invention according to claim 3 wherein said rod is advanced through said internally threaded portion of said tube up to the terminus of said threaded portion of said rod, whereby said rod cannot be further advanced with respect to said tube, whereby rotation of said rod is imparted to said tube.

5. The invention according to claim 4 wherein said tube is tapered inwardly over a portion of its length toward said second end of said tube.

6. The invention according to claim 5 wherein the inside diameter of said tube is only slightly greater than the diameter of said rod at said second end of said tube.

* * * * *